United States Patent [19]
Chabah

[11] 4,064,510
[45] Dec. 20, 1977

[54] HIGH REPETITION FREQUENCY SIDE-LOOKING PULSE RADAR SYSTEM

[75] Inventor: Maurice Chabah, Paris, France
[73] Assignee: Thomson-CSF, Paris, France
[21] Appl. No.: 697,738
[22] Filed: June 18, 1976
[30] Foreign Application Priority Data
    June 24, 1975    France ................... 75.19740
[51] Int. Cl.² ............. G01S 9/10; G01S 9/22; G01S 9/52
[52] U.S. Cl. .................. 343/7.5; 343/5 CM; 343/16 M
[58] Field of Search .............. 343/5 CM, 7.5, 16 M

[56] References Cited
U.S. PATENT DOCUMENTS

| | | | |
|---|---|---|---|
| 3,341,847 | 9/1967 | Fried et al. | 343/7.5 |
| 3,728,724 | 4/1973 | Alpers | 343/7.5 |
| 3,927,405 | 12/1975 | Painsard et al. | 343/5 CM |

Primary Examiner—Malcolm F. Hubler
Attorney, Agent, or Firm—Cushman, Darby & Cushman

[57] ABSTRACT

The invention relates to side-looking radar systems and more especially to high altitude airborne radar systems functioning at a high repetition frequency. In order to avoid ambiguities in regard to distance, the antenna comprises an additional channel which has a radiation pattern which has an odd symmetry about its axis and means are connected to said antenna for deriving the angular interval relative to the axis of the antenna of the direction of the obstacle corresponding to the received echoes. Gating means select the angular interval signal at the middle of the recurrence, for controlling the recurrence frequency of the radar and maintaining the ambiguous areas outside the selected observed area.

4 Claims, 5 Drawing Figures

HIGH REPETITION FREQUENCY SIDE-LOOKING PULSE RADAR SYSTEM

This invention relates to side-looking radar, also termed synthetic aperture radar or airborne ground-mapping radar systems. Radar systems of this kind, carried on board an aircraft or space vehicle, are used for exploring the surface of the earth or of any other planet with a view to producing a radar map or photograph from the signals received.

Systems of the kind in question generally comprise an antenna usually mounted to be side-looking since it is looking in a direction perpendicular to the direction of motion of the carrier vehicle. Each pulse emitted scans the area of ground covered by the antenna beam. The motion of the vehicle, combined with the lateral scanning of the pulses, thus enables an image of the terrain to be obtained. These systems, which use electromagnetic waves in a frequency range lower than that of optical sensors, are not subject to the atmospheric influences (clouds, sunshine) which optical sensors are.

The quality of the images obtained is determined on the one hand by the azimuth resolution (i.e. in the direction of motion of the vehicle) and on the other hand by the range resolution (in the direction perpendicular to the motion of the vehicle). Conventional radar systems of this type are designed to achieve range resolution by the radiation of short pulses and azimuth resolution by the radiation of a narrow beam.

The range resolution is generally obtained by pulsecompression techniques wich are described in chapter 20 of Radar Handbook of Merrill J. Skolnik edited by Mc Graw-Hill Book Co., New-York, 1970. The azimuth resolution is obtained by the generation of a synthetic signal as discussed in chapter 23 of the same Radar Handbook or U.S. Pat. No. 3 927 405 filed by the Applicant.

The use of radar systems such as these on board a space vehicle, in particular, places the radar under working conditons very different from those encountered on board an aircraft.

In particular, the flight characteristics (velocity, altitude, ) of a space vehicle necessitate the use of a high pulse recurrence frequencies which gives rise to range ambiguities or blink areas on the ground.

As a safeguard against these ambiguities, it is possible to use the directivity of the antenna beam which necessitates exact positioning and precise knowledge of the radar distance. If positioning is not sufficiently accurate or if the flight characteristics of the carrier vehicle are modified, the blind areas of the radar may be situated inside the area illuminated by the antenna, adversely affecting the quality of the image obtained.

The present invention relates to a radar system which does not have any of these disadvantages.

One object of the present invention is to provide a sidelooking radar system which, mounted on board a space vehicle, is capable of producing a radar map of the earth.

Another object of the invention is to obtain a map of which the dimension in the direction perpendicular to the direction of motion of the vehicle is maximal without introducing ambiguous information.

Another object of the invention is automatically to control the recurrence period of the pulses in dependence upon the flight characteristics of the vehicle.

The invention is based on the fact that only the limited area situated between two consecutive blind areas on the ground can be observed by the radar system. Means for the automatic adjustment of the pulse repetition frequency are provided for maintaining the blind area onto the zone to be observed. Angular measuring means associated with the antenna are used in combination with range gating means in the receiver for controlling automatically the pulse repetition frequency (PRF) as a function of the angular deviation, with respect to an axis, of the direction of an obstacle on the ground corresponding to the particular echo received in the recurrence by said gating means.

The gating means receive the echo situated in the middle of the recurrence so that the direction of the corresponding obstacle on the ground tends to be situated on the axis of the antenna.

According to the invention, there is provided a side-looking airborne radar system comprising, a frequency controlled pulse repetition frequency generator, a transmitter pulsed thereby and an antenna for transmitting pulse signals towards a selected ground area, a receiver coupler to said antenna for receiving echo signals reflected from said area, angular measuring means for measuring the magnitude and the sense of the angular interval between the axis of the antenna and the direction of the obstacles on the ground corresponding to said echo signals, gating means coupled to said angular measuring means and controlled by said pulse repetition frequency generator for selecting the angular interval signal of the obstacle corresponding to the echo signal received in the middle of the radar recurrence, and means for controlling the frequency of said pulse repetition frequency generator by said selected angular interval signal.

According to another aspect of the invention, the angular indication is obtained by means of an additional monopulse type receiving channel in the antenna, said channel having a radiation pattern which presents a minimum amplitude and a change in the sign on the axis of the antenna, and circuits for detecting angular interval connected to said channel.

The invention will be better understood from the following description in conjunction with the accompanying drawings, wherein:

FIGS. 1a and b show the geometric configuration of the system;

Figure 1:
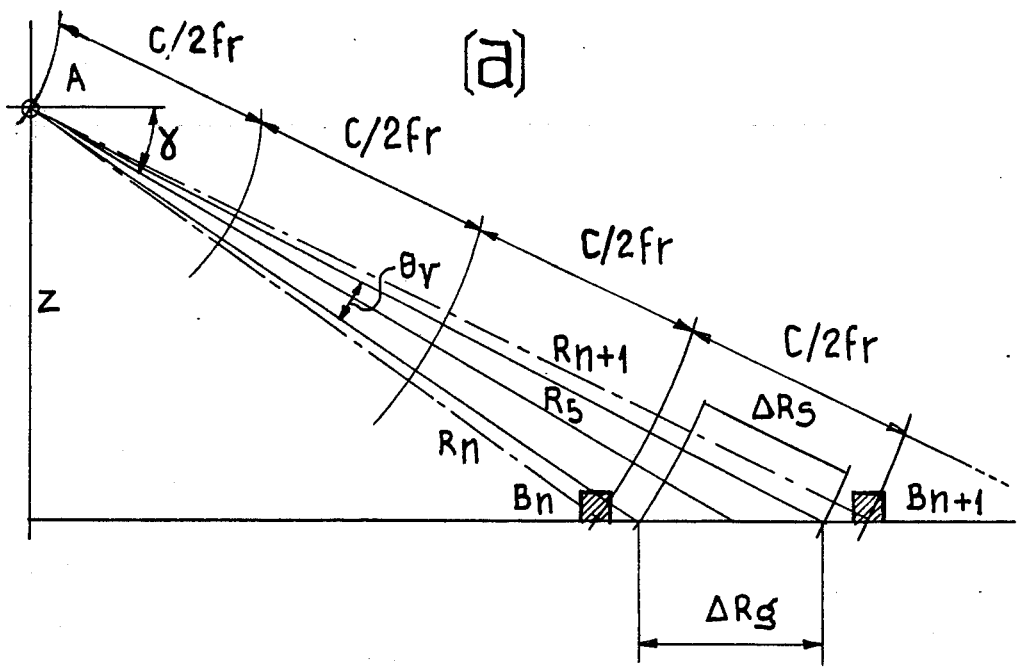
Figure 1:
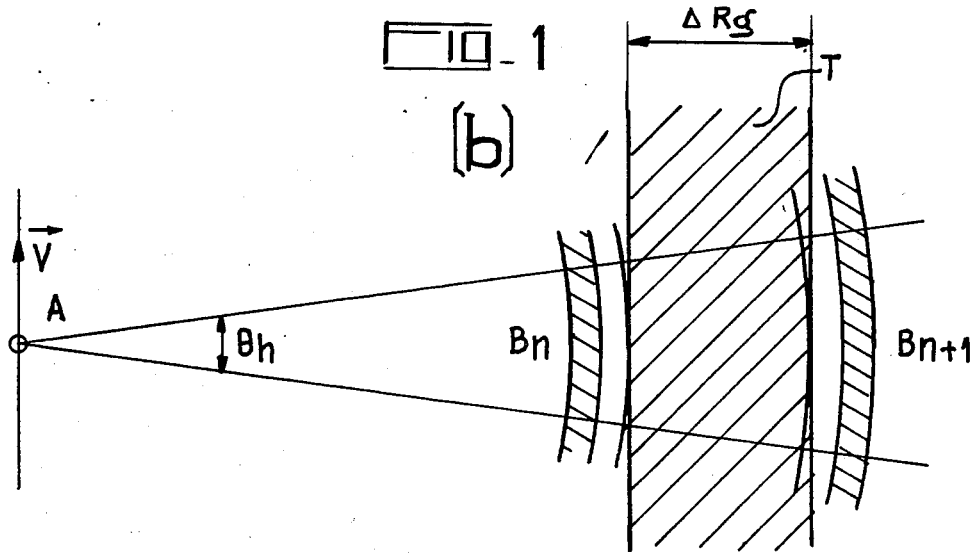

A side-looking radar system is a system intended to form a map of the ground from a remote base. The geometric configuration of such a system is illustrated in FIGS. 1(a) and 1(b).

A vehicle A carries the radar system. The antenna of this system is directed towards the ground in a direction perpendicular to the vector $\vec{V}$ of the vehicle. It is assumed that the vehicle A is at an altitude Z. The radar system monitors an area of ground T by virtue of its antenna directed towards the ground, the axis of th antenna forming an angle $\gamma$ with the plane of the ground.

In a vertical plan, FIG. 1(a) shows the antenna beam of aperture $\theta v$ illuminating the ground over a width $\epsilon R_g$ which represents one radar distance interval $\Delta R_s$. The mean distance of the radar from the ground is $R_s$.

In projection on the ground, FIG. 1(b) shows the horizontal aperture $\theta h$ of the antenna beam and the zone illuminated by that beam at any given moment. When the vehicle A is in motion, this zone describes a band T of width Rg parallel to the velocity vector $\vec{V}$ of the vehicle.

The working principle of a synthetic-aperture-radar system is based on the coherent treatment of the signals received during the passage of the antenna beam over a target while the carrier vehicle is travelling in a longitudinal path. In particular, the Doppler frequency of these signals is utilized, which imposes a limitation upon the recurrence frequency fr of the radar. The radar signal is in fact sampled at the freqency fr which gives rise to the relation :

$$fr \geq 2fd_{max}$$

$fd_{max}$ being the highest Doppler frequency to be used.

This frequency is associated with the velocity V of the vehicle A and with the azimuthal aperture $\theta h$ of the antenna beam by the relation :

$$fd_{max} = \frac{\theta_h V}{\lambda}$$

$\lambda$ being the wavelength of the radar signal.

On the other hand, $\theta h$ is associated with the dimension L of the antenna by the relation $$\theta_h = k\frac{\lambda}{L}$$

where $k$ is a coefficient slightly greater than 1, depending upon the type of antenna.

Accordingly, it follows that :

$$fr \geq 2k\frac{V}{L} \quad (1)$$

In the case of a satellite, the altitude Z is high and the velocity V also high (of the order of 8000m/second). Accordingly, the recurrence frequency of the radar will be high and the signals reflected by the ground will arrive at the radar several recurrences after transmission.

Since the radar can only receive echoes between the transmission times, FIG. 1(a) shows that the zone which can be observed on the ground should be situated between two circles with centres at A of which the radii are separated by a distance of (C/2fr) , C being the velocity of light.

In view of the inclination of the antenna beam relative to the ground, the width of this zone is expressed by the relation :

$$\Delta Rg \leq \frac{2}{2fr \cos \gamma}$$

from which it follows that $$fr \leq \frac{C}{2\Delta Rg \cos \gamma} \quad (2)$$

It can be seen that the recurrence frequency of the radar fr is limited on the one hand by the velocity V of the carrier vehicle and the dimension L of the antenna (relation 1) and, on the other hand, by the width $\Delta$Rg of the area of ground to be observed and the inclination $\gamma$ of the antenna beam (relation 2) :

$$2k\frac{V}{L} \leq fr \leq \frac{C}{2\Delta Rg \cos \gamma}$$

Accordingly, the widest area which may be covered is :

$$\Delta Rg_{max} = \frac{C}{4k \cos \gamma} \cdot \frac{L}{V} \quad (3)$$

This area is a function of the ratio L/V. In view of the technological difficulties involved in putting into orbit an antenna of large dimensions for a satellite, the length L of the antenna is of the order of 5 to 10 meters and the velocity V is, for example, 8000 m/second. According to the relation (3), the width $\Delta Rg_{max}$ of the observable area may amount to between 50 and 100 kms.

In practice, the observable area is less than $\Delta Rg_{max}$ due, on the one hand, to the existence of blind zones corresponding to the transmission times and, on the other hand, to ambiguities in terms of distance which may arise between the zone $\Delta Rg$ and the adjacent zones.

Figure 3:
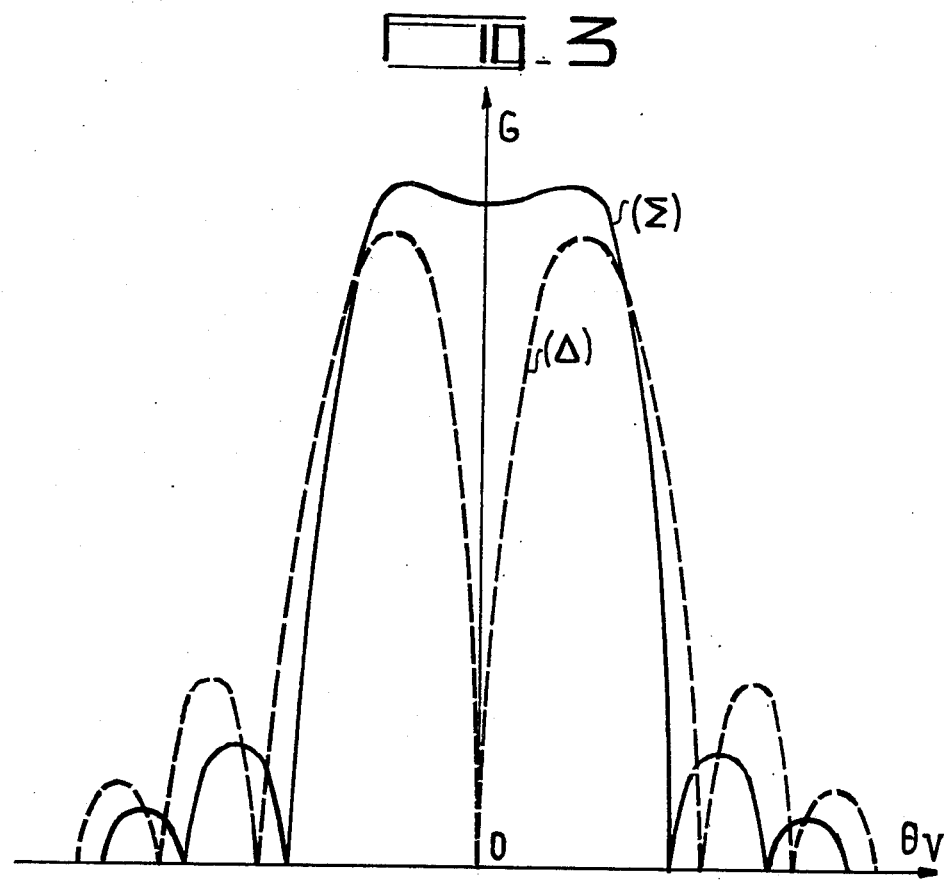
FIG. 3 shows the direction patterns of the antenna.

As a safeguard against ambiguities such as these, use is made of the directivity of the antenna beam in the vertical plane so that it only covers the useful interval $\Delta Rg$ (curve ($\Sigma$) in FIG. 3).

However, if the orientation of the antenna is not exact or if the geometry of the system (for example the altitude of the carrier vehicle) is modified, the blind areas due to the range-ambiguities may be situated within the zone covered by the antenna which would adversely affect the quality of the image obtained.

The radar system according to the present invention is capable of detecting and correcting this phenomenon.

The principle used comprises identifying the echo corresponding to the middle of the radar recurrence and measuring its direction in relation to the axis of the antenna beam. The angular interval thus measured enables the radar recurrence to be shortened or lengthened so that the middle of the recurrence thus corrected corresponds to the direction of the axis of the beam.

It is known that the ambiguous distances are equal to $$Rn = n\frac{C}{2fr}$$

and that the antenna beam can only cover on the ground a zone of width $\Delta Rg$ less than $$\Delta Rg_{max} = \frac{C}{2fr \cos \gamma}$$

The non-ambiguous distance interval, situated between the distances Rn and Rn + 1, is schematically illustrated in FIG. 1 by the boundary marks Bn and Bn + 1. The echoes emanating from the direction of teh axis of the antenna are thus received in the middle of the radar recurrence.

If, for any reason (change in the altitude Z, in the distance RS or in the inclination $\oplus$), one of the boundary marks Bn or Bn + 1 is situated within the interval $\Delta Rg$, the middle of the recurrence no longer corresponds to echoes situated in the axis of the antenna. By increasing or reducing the recurrence frequency fr, the boundary marks Bn and Bn + 1 resume their position symmetrically on either side of the interval $\Delta Rg$.

In order to determine the angular interval between the direction of the echoes situated in the middle of the recurrence and the axis of the antenna, the antenna is provided in accordance with the invention with an additional receiving channel of which the radiation pattern is similar to those of the "difference" channel of a monopulse antenna.

The output signal delivered by the difference channel is an odd, real function of the angle of arrival. It indicates magnitude and sense of the angle of arrival; it has odd symmetry about the boresight direction which is the axis of the antenna.

Figure 2:
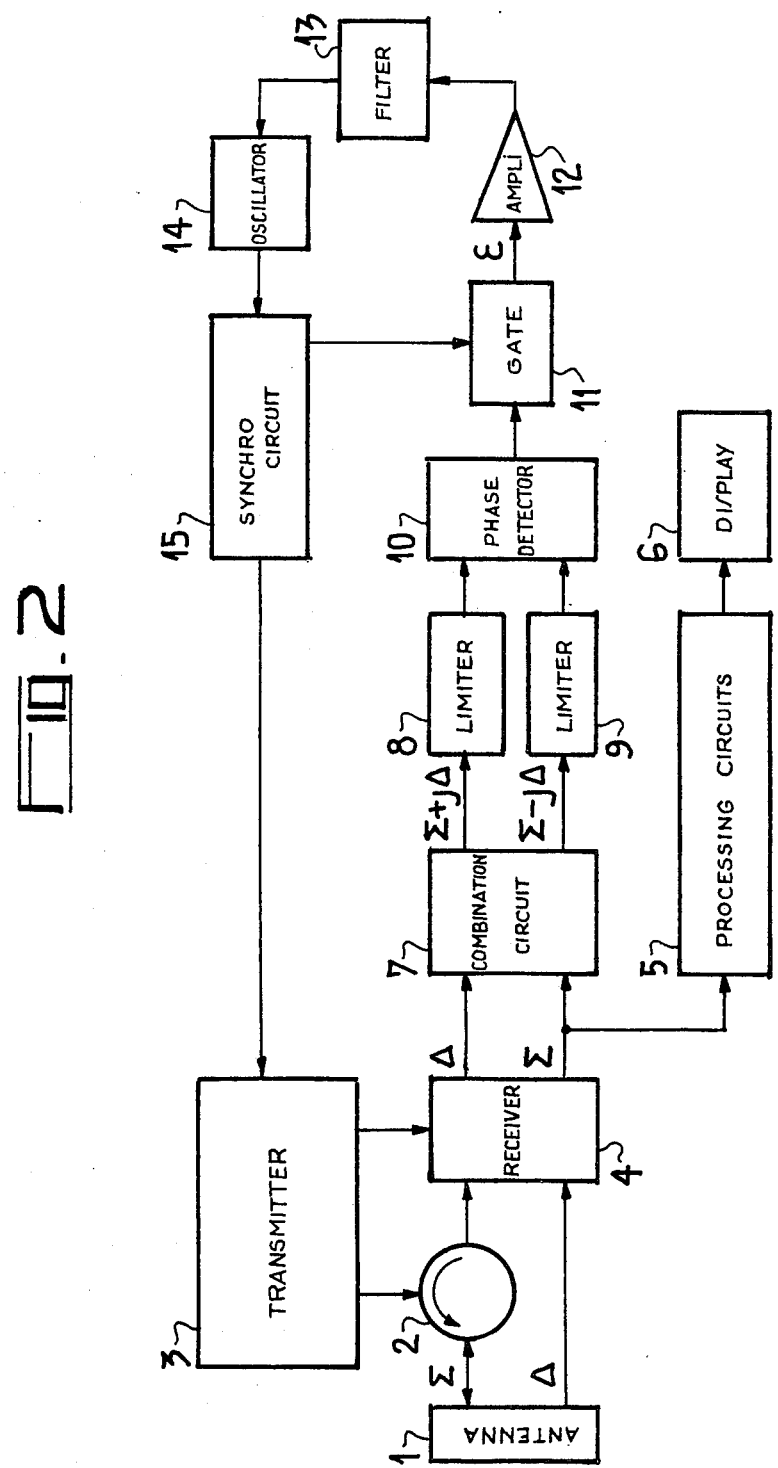
FIG. 2 is a plan of the radar system.

FIG. 2 is a block diagram illustrating the principle of the side-looking radar system according to the invention.

The system uses a two-channel antenna 1. The first channel is used for transmitting and receiving. Its radiation pattern has even symmetry about the axis of the antenna or boresight axis and is directive in the vertical plane so that it only illuminates a non-ambiguous area of the ground. The signals delivered by this channel on reception are called "sum" signals $\Sigma$. The second channel, termed the "difference" channel, has an odd radiation pattern symmetry in the vertical plane, its gain being zero in the axis of the antenna. The signals received in this channel are called "difference" signals $\Delta$.

FIG. 3 illustrates the radiation patterns of the antenna 1. The gain G of this antenna is shown as a function of the angle $\theta v$ relative to the axis of the antenna. The solid-line curve represents the pattern ($\Sigma$) of the sum channel whilst the dotted-line curve ($\Delta$) represents the pattern of the difference channel.

A transmitter 3 is coupled with the sum channel of the antenna 1 by way of a circulator 2. The signals $\Sigma$ received are applied to a receiver 4 by way of the circulator 2. The signals $\Delta$ are directly applied to the receiver 4. The receiver comprises the initial hyper-frequency amplification stages and the mixers coupled with the emitter which subsequently deliver the same signals $\Sigma$ and $\Delta$ converted into an intermediate frequency. The sum signals are then applied to conventional processing circuits 5 which carry out the synthetic sharpening of the beam at its azimuth so as to obtain the required azimuth resolution, and a display or a recorder 6. These processing circuits generally comprise an optical or electronic correlator. However, since the invention is not concerned with this part of the system, it is not intended here to give any further particulars thereof, especially since such particulars are widely known among experts.

The present invention is embodied in the treatment of the signals $\Sigma$ and $\Delta$ with a view to obtaining an automatic variation in the recurrence frequency of the radar so that the axis of the antenna is always directed towards the middle of the nonambiguous zone.

The signals $\Sigma$ and $\Delta$ are applied to a conventional combination circuit 7 which delivers signals $\Sigma + j\Delta$ and $\Sigma - j\Delta$, $j$ being the 90° rotation operator. These signals are limited in amplitude in limiters 8 and 9 and are then applied to a phase detector 10. The output signal of this detector gives an angular indication of the echoes situated in the antenna beam. For each echo, this signal is proportional to the angular interval between the direction of the echo-generating obstacle and the axis of the antenna and its sign is positive or negative according to whether the obstacle is situated above or below the axis of the antenna.

These circuits are the same which are commonly used in radar systems of the monpulse type.

Figure 4:
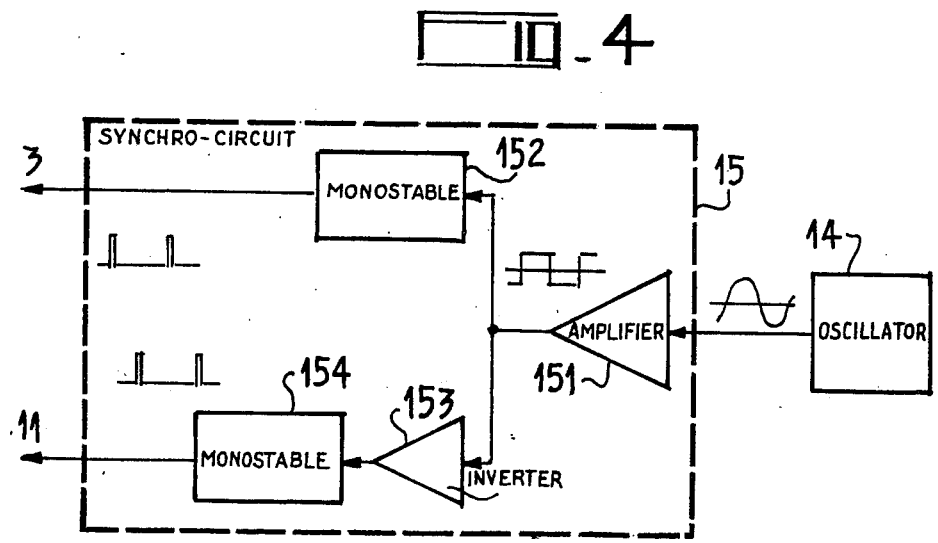
FIG. 4 shows a detail of the system illustrated in FIG. 2.

The output signal of the detector 10 is applied to a range gate 11. This gate, which is controlled by the synchronisation circuit 15, removes a sample from the angular interval signal at the middle of the recurrence and subsequently transmits it to an amplifier 12 followed by a filter 13 connected to the frequency control input of an oscillator 14. This oscillator works at a frequency equal to the recurrence frequency. The pulses which it delivers are applied alternately to the transmitter 3 and to the gate 11 through the synchronisation circuit 15. The synchronisation circuit 15 is shown in FIG. 4.

The synchronisation circuit 15 comprises a limiting amplifier 151 which converts the sine-wave signals delivered by the oscillator 14 into square-wave signals. A first monostable circuit 152 delivers to the transmitter 3 calibrated pulses released by the negative fronts of the output signal of the amplifier 151. A second monostable circuit 154 delivers to the gate 11 identical pulses released by the positive fronts by virtue of an inverter circuit 153.

The recurrence frequency of the radar system, which is equal to the frequency of the oscillator 14, is controlled from the circuits 7 to 13 so that the echo situated in the axis of the antenna is received at the middle of the recurrence. The sum signals and different signals, $\Sigma$ and $\Delta$, are delivered into the circuits 7 to 10 whose function is to provide an angular indication. Their video output is sampled every half a recurrence by the gate 11 covers a period equal to the duration of the pulse transmitted. The sign of the angular inerval thus obtained shows whether the echo corresponding to the middle of the recurrence is received before or after the echo situated on the axis of the antenna beam, in which case the duration of the recurrence has to be lengthened or shortened by decreasing or increasing the frequency $fr$ of the oscillator 14.

In addition, since the gradient of the angular interval indication of the system is known, the voltage representing this indication at the output of the detector 10 is proportional to the angular interval $\epsilon$ which is itself associated with the correction to be made to the recurrence frequency by the relation:

$$\left| \frac{\epsilon}{tg\,\gamma} \right| = \left| \frac{\Delta fr}{fr} \right|$$

being the angle which the axis of the beam forms with the ground observed (cf. FIG. 1). The frequency correction loop 11-12-13-14-15 comprises a filter 13 of which the time constant makes it possible to act on the response time of the system.

For example, if the altitude of the ground observed varies, filtration enables the system to be brought under the control of the variations in the mean altitude of the ground, integrating the effect of local variations.

The system described above enables the operationsl autonomy of a space platform to be increased by making it less dependent upon ground control.

It also enables the alignment tolerances of the antenna (or of the platform) to be widened, the effects caused by misalignment being automatically compensated.

It also enables the orientation of the antenna beam to be modified which in turn enables the angle at which the terrain is observed to be varied.

It also enables an observer satellite to be put into an orbit of which the altitude is not strictly constant (elliptical orbit for example).

The invention is applicable to air and space navigation.

What is claimed is:

1. In a side-looking airborne pulse radar system, means for maintaining the direction of an echo received in the middle of each recurrence from a ground area observed by the radar system, substantially coincident with a predetermined axis, comprising:

angular measuring means responsive to the angular interval between said axis and the direction of received ground echos and to the pulse repetition frequency of the radar system for providing an output signal indicative of the amplitude and the sense of the angular inerval between said axis and the direction of the echo received in the middle of each recurrence; and frequency controlled pulse repetition frequency generator means coupled to the output of said angular measuring means for controlling the pulse repetition frequency of said radar system so as to tend to reduce said angular interval to null.

2. A radar system as claimed in claim 1, wherein said angular measuring means comprises:

antenna means having a radiation pattern which has an odd symmetry about said predetermined axis in a vertical plane;

receiving means coupled to said antenna means for providing echo signals repesentative of the magnitude and the sense of the angular interval between said predetermined axis and the direction of obstacles on the ground corresponding to said echo signals; and gating means coupled to an output of said receiving means and to said frequency controlled pulse repetition frequency generator means for selecting the only echo signal received in the middle of the recurrence of the radar system.

3. A radar system as claimed in claim 2, wherein said antenna means comprises a sum channel having a radiation pattern which has an even symmetry about said predetermined axis for providing a sum signal $\Sigma$ and a difference channel having a radiation pattern which has an odd symmetry about said predetermined axis for providing a difference signal $\Delta$, and wherein said receiving means comprises a combination circuit connected to said sum channel and said difference channel of said antenna for providing output signals $\Sigma + j\Delta$ and $\Sigma - j\Delta$, a phase-detector circuit having two inputs and an output for delivering the angular echo signals and two limiting circuits respectively connected between the outputs of the combination circuit and the inputs of said phase-detector circuit.

4. A radar system as claimed in claim 1, wherein said frequency controlled pulse repetition frequency generator means comprise a controllable frequency oscillator having a control input, a synchronization circuit connected to said oscillator for delivering control pulses alternately to the radar system for controlling the pulse repetition thereby on the one hand and to the angular measuring means on the other hand, and amplifying and filtering means connected to said control input of said oscillator for receiving output signal from the angular measuring means and controlling thereby the frequency of said oscillator.

* * * * *